US010079750B2

(12) United States Patent
Branson et al.

(10) Patent No.: US 10,079,750 B2
(45) Date of Patent: *Sep. 18, 2018

(54) LIMITING DATA OUTPUT FROM WINDOWING OPERATIONS

(71) Applicant: International Business Machines Corporation, Armonk, NY (US)

(72) Inventors: Michael J. Branson, Rochester, MN (US); Jay S. Bryant, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,906

(22) Filed: Nov. 9, 2017

(65) Prior Publication Data

US 2018/0069777 A1 Mar. 8, 2018

Related U.S. Application Data

(63) Continuation of application No. 14/734,590, filed on Jun. 9, 2015, now Pat. No. 9,853,878.

(51) Int. Cl.
*G06F 15/16* (2006.01)
*H04L 12/26* (2006.01)
(Continued)

(52) U.S. Cl.
CPC ........ *H04L 43/16* (2013.01); *G06F 17/30516* (2013.01); *H04L 43/0882* (2013.01); *H04L 47/22* (2013.01); *H04L 47/25* (2013.01)

(58) Field of Classification Search
CPC .................. G06F 17/30516; G06F 2209/5022
See application file for complete search history.

(56) References Cited

U.S. PATENT DOCUMENTS 7,613,848 B2 11/2009 Amini et al.
7,644,110 B2 1/2010 Nishizawa et al.
(Continued)

FOREIGN PATENT DOCUMENTS

WO 2013078682 A1 6/2013

OTHER PUBLICATIONS

Ballard et al., "IBM InfoSphere Streams: Harnessing Data in Motion," IBM Redbooks, Sep. 2010, 360 pages, Copyright International Business Machines Corporation 2010, http://www.redbooks.ibm.com/abstracts/sg247865.html.
(Continued)

*Primary Examiner* — Hieu Hoang
(74) *Attorney, Agent, or Firm* — Robert J. Shatto

(57) ABSTRACT

A method for regulating output from stream operators performing a windowing operation may include receiving stream of tuples to be processed by a plurality of processing elements, each processing element having one or more stream operators. The method may also include receiving a first stream of tuples at a first stream operator, the first stream operator being configured to generate a stream of accumulated tuples according to a set of windowing conditions. The method may then include processing the stream of accumulated tuples in response to a window trigger, where the processing generates a quantity of output. At least one processor may then monitor the quantity of output to determine whether the quantity of output exceeds a data output threshold. The processing may then be adjusted, in response to determining that the quantity of output exceeds the data output threshold, to reduce the output to approach the data output threshold.

14 Claims, 11 Drawing Sheets

(51) Int. Cl.
*H04L 12/815* (2013.01)
*G06F 17/30* (2006.01)
*H04L 12/825* (2013.01)

(56) References Cited

U.S. PATENT DOCUMENTS

| | | | |
|---|---|---|---|
| 8,095,690 | B2 | 1/2012 | Kashiyama et al. |
| 8,560,526 | B2 | 10/2013 | Santosuosso et al. |
| 9,298,788 | B1 | 3/2016 | Kekre et al. |
| 2006/0133678 | A1* | 6/2006 | Yokota .................. G06F 3/1219 382/239 |
| 2008/0005392 | A1 | 1/2008 | Amini et al. |
| 2009/0238277 | A1* | 9/2009 | Meehan ............... H04N 19/124 375/240.16 |
| 2012/0218268 | A1 | 8/2012 | Accola et al. |
| 2012/0311172 | A1 | 12/2012 | Branson et al. |
| 2013/0080413 | A1 | 3/2013 | Chen et al. |
| 2013/0179591 | A1 | 7/2013 | Branson et al. |
| 2013/0290489 | A1 | 10/2013 | Branson et al. |
| 2013/0305227 | A1 | 11/2013 | Branson et al. |
| 2014/0095503 | A1 | 4/2014 | Branson et al. |
| 2014/0095506 | A1 | 4/2014 | Branson et al. |
| 2014/0181144 | A1 | 6/2014 | Kashiyama |
| 2015/0248462 | A1 | 9/2015 | Theeten et al. |
| 2016/0241770 | A1* | 8/2016 | Su ..................... H04N 5/23206 |
| 2016/0328450 | A1 | 11/2016 | Branson et al. |
| 2016/0328464 | A1 | 11/2016 | Branson et al. |
| 2016/0366042 | A1 | 12/2016 | Branson et al. |

OTHER PUBLICATIONS

List of IBM Patents or Patent Applications Treated as Related, Nov. 8, 2017, 2 pgs.

* cited by examiner

LIMITING DATA OUTPUT FROM WINDOWING OPERATIONS

BACKGROUND

The present disclosure relates to stream computing, and more specifically to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

According to embodiments of the present disclosure, a computer implemented method for regulating output from one or more stream operators performing a windowing operation may include receiving stream of tuples to be processed by a plurality of processing elements operating on one or more processors, each processing element having one or more stream operators. The method may also include receiving a first stream of tuples at a first stream operator, the first stream operator being configured to generate a stream of accumulated tuples according to a set of windowing conditions. The method may then include processing, by the first stream operator, the stream of accumulated tuples in response to a window trigger, where the processing generates a quantity of output. At least one processor may then monitor the quantity of output to determine whether the quantity of output exceeds a data output threshold. The processing may then be adjusted, in response to determining that the quantity of output exceeds the data output threshold, to reduce the output to approach the data output threshold.

Other embodiments are directed to systems and computer program products.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
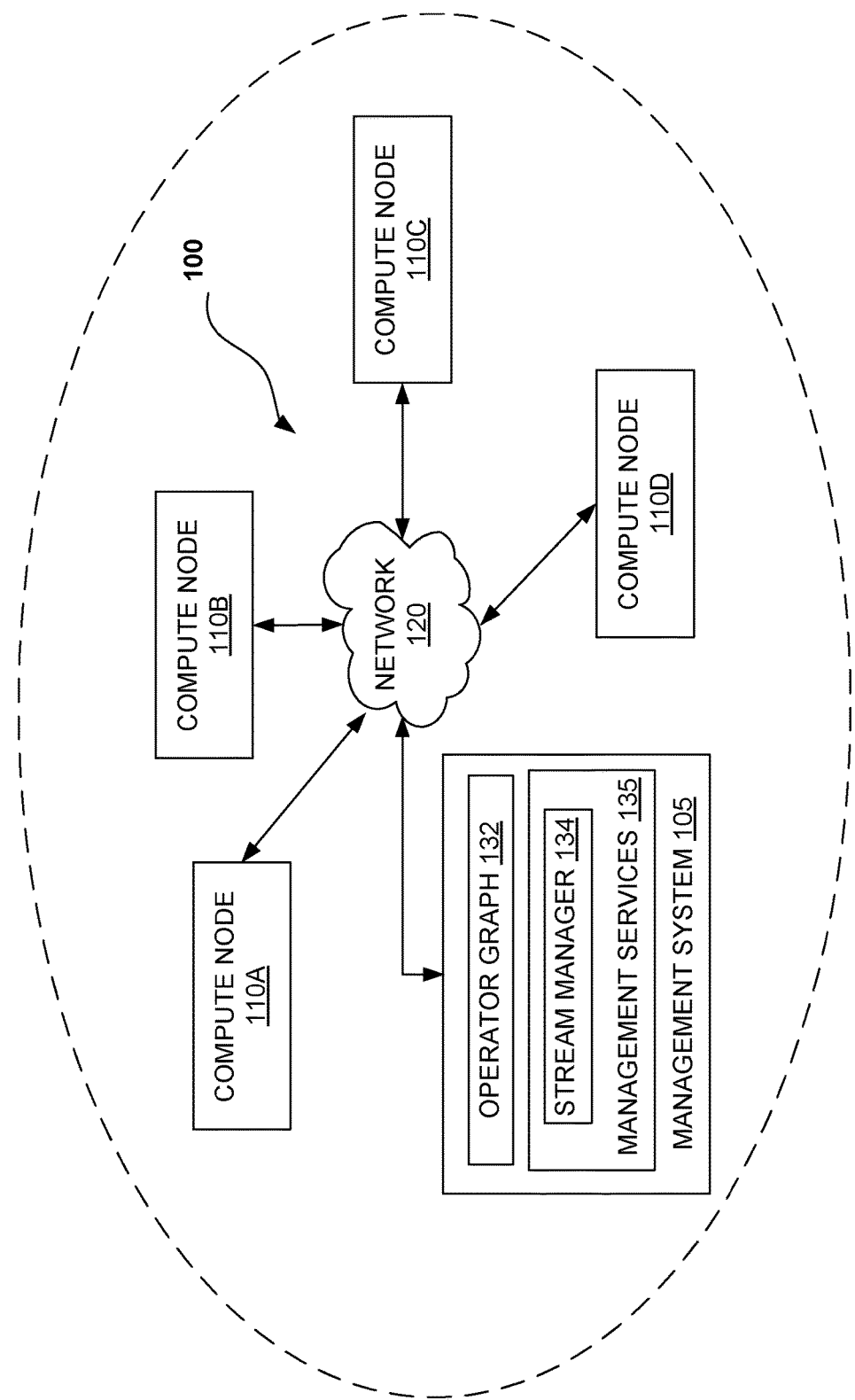
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, and in particular, to computing applications that receive streaming data and process the data as it is received. While the present disclosure is not necessarily limited to such applications, various aspects of the disclosure may be appreciated through a discussion of various examples using this context.

Embodiments of the present disclosure are based on the recognition that an operator in a stream processing application can sometimes produce too much data during a windowing operation. Additionally, stream processing applications may want to exercise control over the flow of data through an application graph (e.g., an operator graph) by limiting the amount of processing a given window operation can produce. Accordingly, various embodiments of the present disclosure are directed towards a computer implemented method for regulating (e.g., limiting) the output from one or more stream operators performing a windowing operation. The method may include comparing a quantity of output from a stream operator processing tuples accumulated in a window against a data output threshold, and adjusting the processing of the accumulated tuples to reduce the quantity of output when the output exceeds the data output threshold. Some embodiments are directed towards a system, and computer program product for implementing the method.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, for convenience, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). In embodiments, this is referred to as a "dynamic connection" because both jobs are currently executing when they begin to share the data stream.

A processing element or stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of a single tuple. As an example, an aggregate stream operator supports windowing by default. However, a stream operator may not necessarily support windowing by default. A stream operator may, however, be configured to support windowing.

A window may be a tumbling or sliding window. A tumbling window may be specified by an eviction policy.

When the eviction policy for a tumbling window is met, the stream operator executes operator logic on the tuples currently in the window and then empties the window. With respect to a tumbling window, the "conclusion" of a windowing condition, in this description and the claims, may refer to when the eviction policy for a tumbling window is met. The eviction policy of a tumbling window may be based on a count of tuples, a time interval, a delta, or punctuation. A delta is a difference between an attribute of an oldest tuple and a newest tuple. For example, a windowing condition may compare timestamps. Processing and eviction may be triggered when a time difference exceeds a specified value. A punctuation is a control signal that appears interleaved with the tuples in a stream. Punctuation appears in the data flow and may, for example, notify a stream operator of the grouping of tuples to be processed.

In contrast to a tumbling window, a sliding window does not automatically flush the window when the window is full. Once a window is full, a sliding window expels the oldest tuple when a new tuple arrives to replace it. In this way, a sliding window maintains the size of the window. A sliding window may be specified by an eviction policy and a trigger policy. The eviction policy of a sliding window may be based on a count of tuples, a time interval, or an attribute delta. The trigger policy specifies when the stream operator executes operator logic on the tuples currently in the window. The trigger policy may be based on a count of tuples, a time interval, or an attribute delta. The eviction and trigger policies are independent of one another. With respect to a sliding window, the "conclusion" of a windowing condition, as used in this description and the claims, may refer to when the trigger condition of a sliding window is met.

The phrase "windowing conditions," as used in this description and the claims, may include the conditions used to describe eviction and trigger policies. A stream operator that includes a windowing condition may be referred to, in this description and the claims, as a windowing operator. Windowing may be specified in any number of ways. For example, an application programmer may define one or more specific windowing conditions. Additionally, the system may provide a set of windowing conditions.

A processing element may have a windowing operator that performs an operation to determine a first value at the conclusion of a windowing condition, i.e., when the eviction policy for a tumbling window is met or when the trigger condition of a sliding window is met. The phrase "windowing operation," as used in this description and the claims, may refer to the operation to determine a first value at the conclusion of a windowing condition.

Referring now to the figures, FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
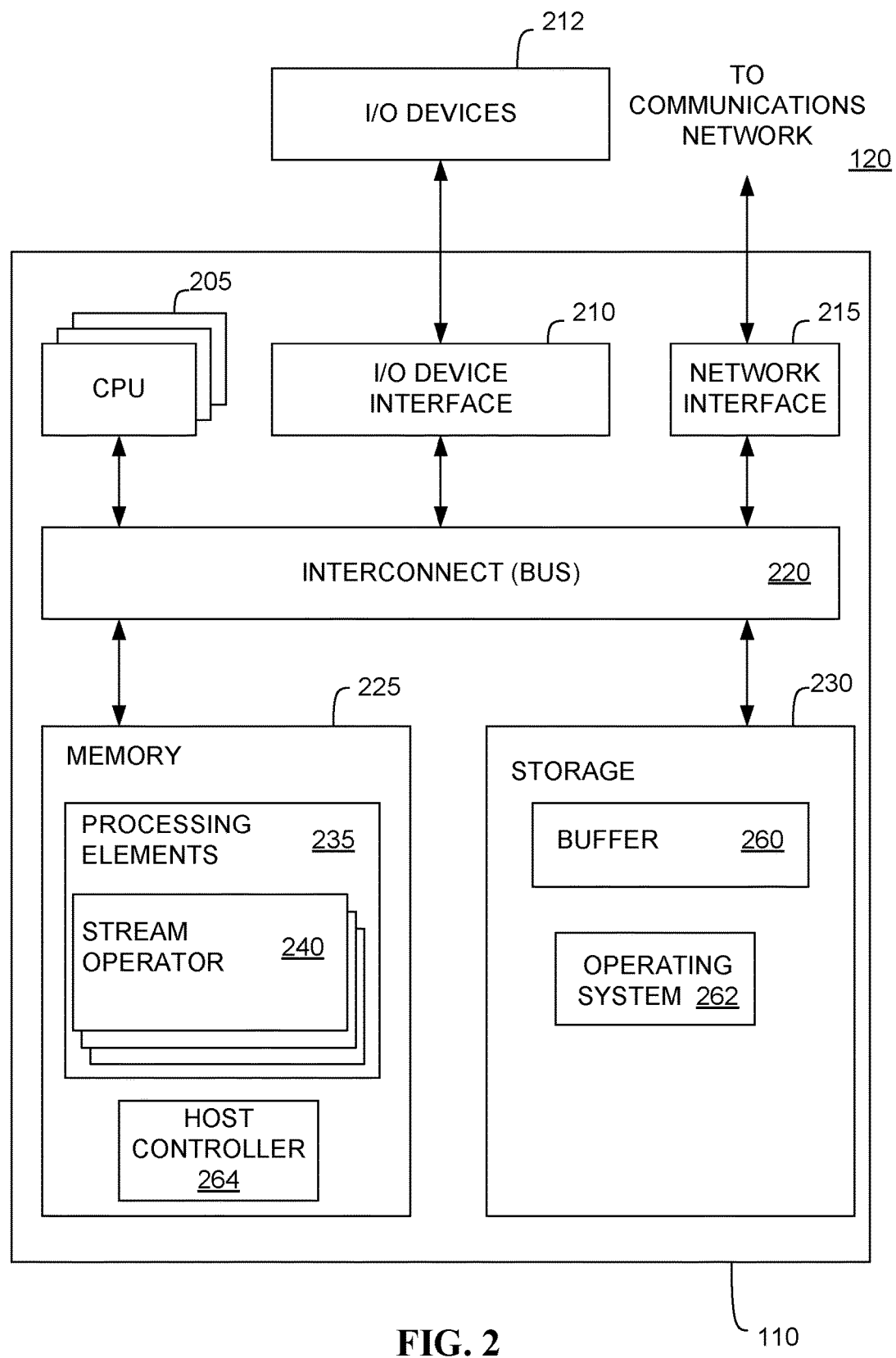
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
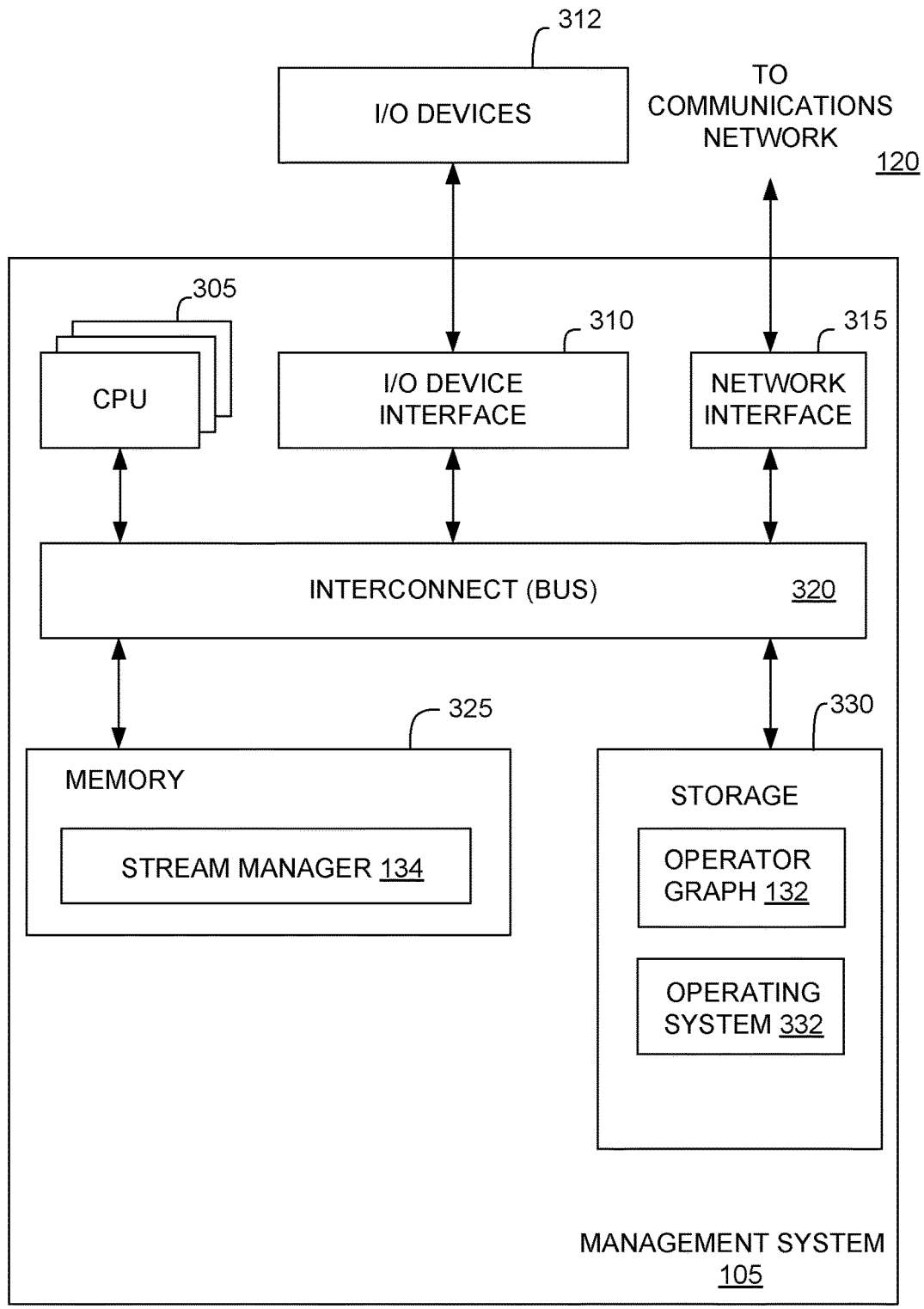
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, or DRAM. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
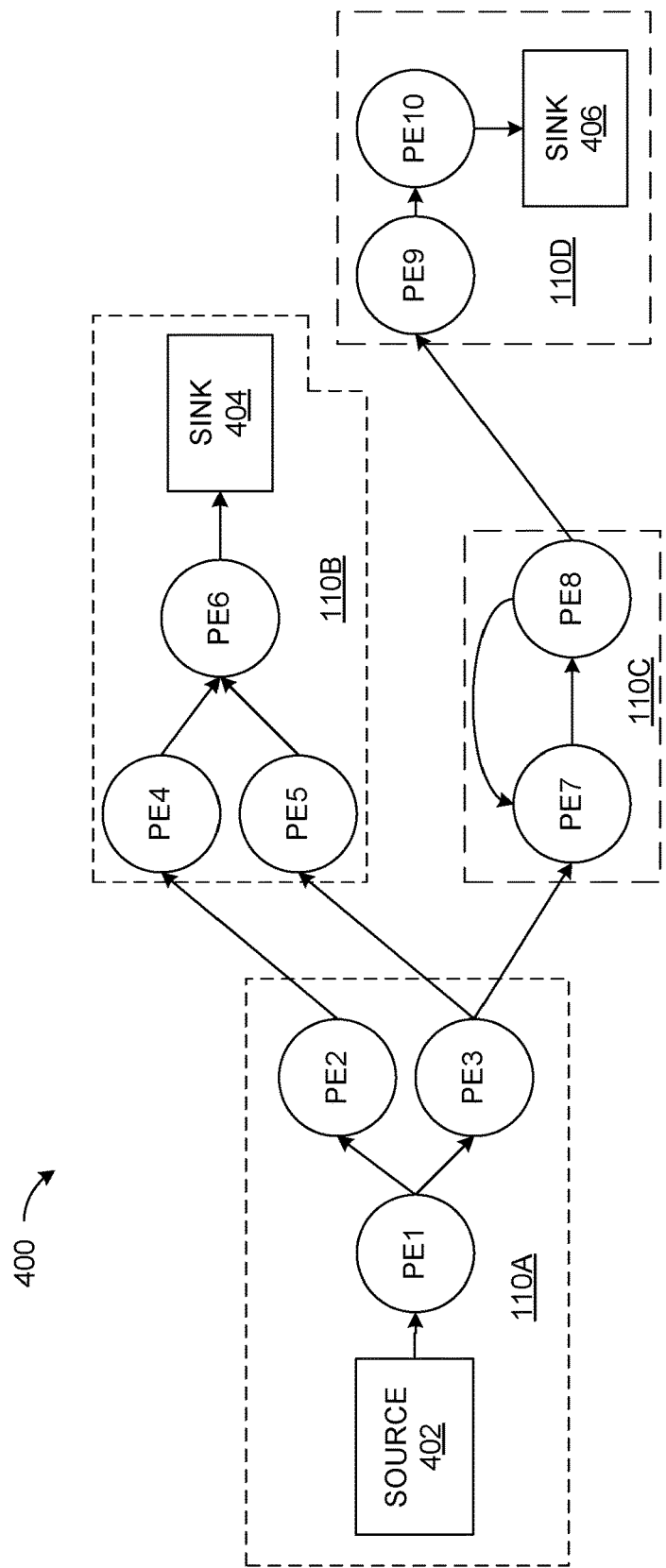
FIG. 4 illustrates an operator graph for a stream computing application, according to various embodiments.

FIG. 4 illustrates an exemplary operator graph 400 for a stream computing application beginning from one or more sources 402 through to one or more sinks 404, 406, according to some embodiments. This flow from source to sink may also be generally referred to herein as an execution path. In addition, a flow from one processing element to another may be referred to as an execution path in various contexts. Although FIG. 4 is abstracted to show connected processing elements PE1-PE10, the operator graph 400 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 400 includes a relatively small number of components, an operator graph may be much more complex and may include many individual operator graphs that may be statically or dynamically linked together.

The example operator graph shown in FIG. 4 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 400 begins at a source 402 and ends at a sink 404, 406. Compute node 110A includes the processing elements PE1, PE2, and PE3. Source 402 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 404. Similarly, tuples flowing from PE3 to PE5 also reach PE6 and are sent to a sink 404. Thus, PE6 could be configured to perform a join operation, combining tuples received from PE4 and PE5, before sending the data to the sink 404. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 406.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element.

However, for convenience, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 4 illustrates execution paths between processing elements for the sake of clarity.

Figure 5:
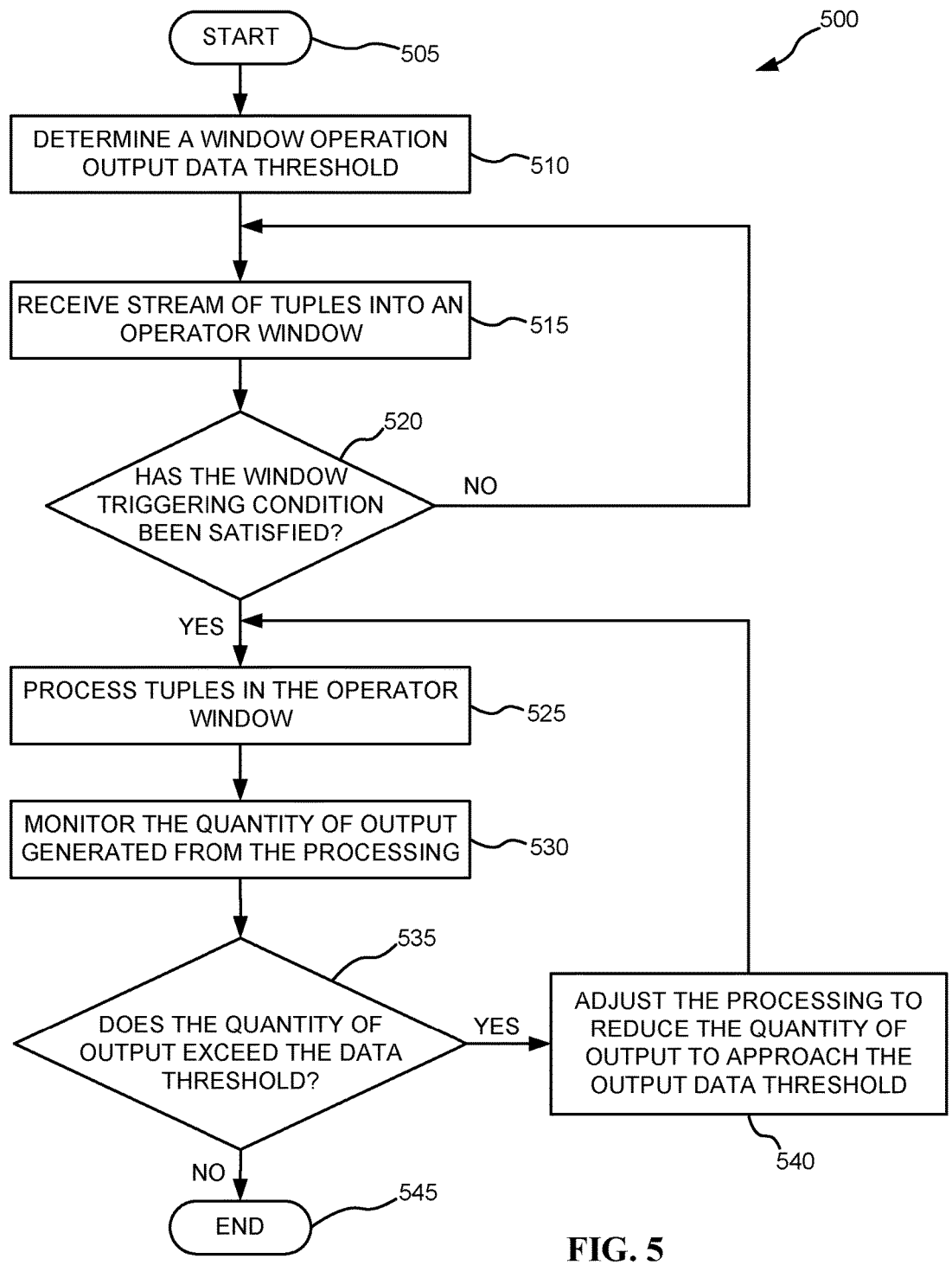
FIG. 5 illustrates a flow chart of a computer implemented method for regulating output from one or more stream operators performing a windowing operation, according to various embodiments.

FIG. 5 illustrates a flow chart of a computer implemented method 500 for regulating output from one or more stream operators performing a windowing operation, according various embodiments. The method 500 may be implemented by a stream computing application, similar to the stream computing application described in FIG. 4, executing on a computing node. The stream computing application may start the method 500 at operation 505 by instantiating one or more windowing operators in the memory of the computing node and establishing an operator graph connecting the operators to streaming data sources and sinks. An exemplar stream computing application implementing the method 100 may be an image processing application configured to receive one or more streams of tuples having, for example, digital images and metadata associated with the digital images. The image processing application may receive the tuples from a source (e.g., one or more upstream operators), process the tuples (e.g., by adding a watermark to the images, and using the metadata tuples to generate a Completely Automated Public Turning Test to Tell Computers and Humans Apart, CAPTCHA, images), and provide the processed tuples to one or more downstream operators or sinks.

The stream computing application may continue the method 500 by performing operation 510, determining a window operation output data threshold (hereinafter "data threshold"). A data threshold, as used herein, can be a limit on the amount of data that is produced by an operator during a windowing operation. In some embodiments the data threshold may be a number of tuples that one or more operators can produce during a windowing operation. In other embodiments, the data threshold may be an amount of data in, for example, kilobytes, that may be produced during a windowing operation.

In some embodiments, the stream computing application may determine the data threshold by reading a previously determined threshold from a memory of the computing node executing the application. In particular embodiments the stream computing application may determine the data threshold by continuously monitoring the flow of data/tuples through the operator graph, identifying points of congestion, and determining an amount by which the output of operators upstream from the congestion point should be reduced from their current level to attenuate or eliminate the congestion. In other embodiments, the stream computing application may determine the output data threshold by continuously monitoring a processor workload in one or more compute nodes. The stream computing application may then determine an amount by which the output of operators, for example, executing on the compute node or providing tuples to the compute node, should be reduced to bring the processor workload within a given range. According to various embodiments, the data threshold may be set below the threshold required to reduce the load on the network or to bring a processor workload to a desired level (e.g., an operating threshold). Setting the data threshold below this operating threshold may lessen the likelihood of the output from a windowing operation exceeding that operating threshold.

The stream computing application may further continue the method 500 by performing operation 515, receiving a stream of tuples into an operator window. Receiving the stream of tuples into an operator window may include one or more operators accumulating tuples received from a source until a given window condition is satisfied or met. The tuples may be received from one or more operators and may be accumulated by one or more operators in an operator window. Referring back to the image processing application example, the window condition may direct an operator to accumulate tuples having digital images and metadata for a certain duration of time (e.g., the operator may accumulate tuples for 5 milliseconds). In some embodiments, a first stream operator may provide a first stream of tuples that contain the digital images, while a second stream operator may provide a second stream of tuples having the metadata. In some embodiments a single operator may provide the digital images and the metadata in a single stream of tuples.

The one or more operators in the stream computing application may accumulate tuples in the operator window until the stream computing application determines that a window trigger condition has been satisfied, as indicated by operation 520. A window triggering condition, as determined by a trigger policy, may direct an operator to stop accumulating tuples in an operator window and perform a windowing operation on the accumulated tuples. Referring again to the image processing example, determining that a window trigger condition has been satisfied may include determining that digital image and metadata tuples have been accumulating in an operator for 5 ms.

The stream computing application may continue the method 500 by performing operation 525, processing the tuples accumulated in the operator window when the window trigger condition has been satisfied. Processing may include performing one or more computer implemented logical or mathematical operation in response to the window trigger. Referring again to the image processing application example, processing the tuples may include an operator performing computer implemented mathematical and logic operations to add a watermark to each raw digital image.

Processing the tuples may also include the operator analyzing the metadata associated with each image and generating, for example, CAPTCHAs images from the metadata. The processed digital images and metadata may be provided to downstream operators in a stream of output tuples.

The method 500 may be continued at operation 530 where the stream processing application monitors the quantity of output (e.g., the stream of output tuples) generated during operation 525. In some embodiments, the quantity of output may be a data size (e.g., in an applicable unit such as bytes, sectors, or blocks), a number of tuples, or tuple/data rate. Monitoring the quantity of output generated may include, for example, maintaining a count of the number of output tuples produced during each windowing operation, or determining the amount of data produced by a windowing operation. In some embodiments, a stream manager (e.g., stream manager 134 in FIGS. 1 and 3) or a thread or routine of the stream processing application may monitor the stream of output tuples produced by operators perform operation 525. In other embodiments, an operator may monitor the quantity of output produced during each windowing operation.

While monitoring the quantity of output from windowing operations, the stream processing application may perform operation 535 and determine whether the quantity of output from one or more operators exceeds the data threshold determined in operation 510. In some embodiments, the stream processing application may determine whether the quantity of output from one or more operators exceeds the data threshold by reading the quantity of output from a memory area of the compute node and comparing the quantity of output against the data threshold value. In other embodiments, the stream processing application may determine whether the quantity of output from one or more operators exceeds the data threshold by receiving a value representing the quantity of output from, for example, stream manager 134 and comparing the quantity of output against the data threshold value. When the quantity of output does not exceed the output data threshold, the stream processing application may end the current iteration of the method 500 at operation 545. In some embodiments the stream processing application may continue the method 500 from one of the previously performed operations while there are still tuples to process.

The stream processing application may perform operation 540 when the quantity of output from an operator exceeds the data threshold. Performing operation 540 may include adjusting the processing of the tuples accumulated in the operator window to reduce the quantity of output to approach the data threshold. According to some embodiments, adjusting the processing of the accumulated tuples may include determining that a first tuple of a stream of accumulated tuples should be excluded from processing operation 525. The stream computing application may identity the first tuple by determining that the stream of accumulated tuples includes at least two different types of tuples. A first tuple (e.g., belonging to a group of tuples of a first type) may be different from a second tuple (e.g., belonging to a group of tuples of a second type) because the first tuple, for example, has an attribute that the second tuple lacks. A first tuple may also be different from a second tuple because the first tuple was received (e.g., during operation 515) in a first stream of tuples while the second tuple was received in a second stream of tuples, different from the first stream. According to some embodiments, the first tuple may also be differentiated from the second tuple according to the impact of each tuple on the quantity of output generated by an operator in response to processing the tuples (e.g., if processing the tuple will likely produce multiple tuples, require certain processor resource, or increase the amount of data included in the quantity of output). The stream computing application may determine that the first tuple should be excluded from processing operation 525 based on, for example, the distinctive attribute, the source of the first tuple, or the impact the first tuple has on the quantity of output produced during operation 525.

In some embodiments, the identified tuple may be excluded from the aggregated stream of tuples processed by a streaming operator. The identified tuple may be discarded or cached for processing at a later time. In other embodiments, the identified tuple may be processed by a stream operator, but output tuples derived from the identified tuple may be excluded from the output of the operator. In certain embodiments, the excluded output tuples may be cached and included in an output of the operator at a later time.

Figure 6:
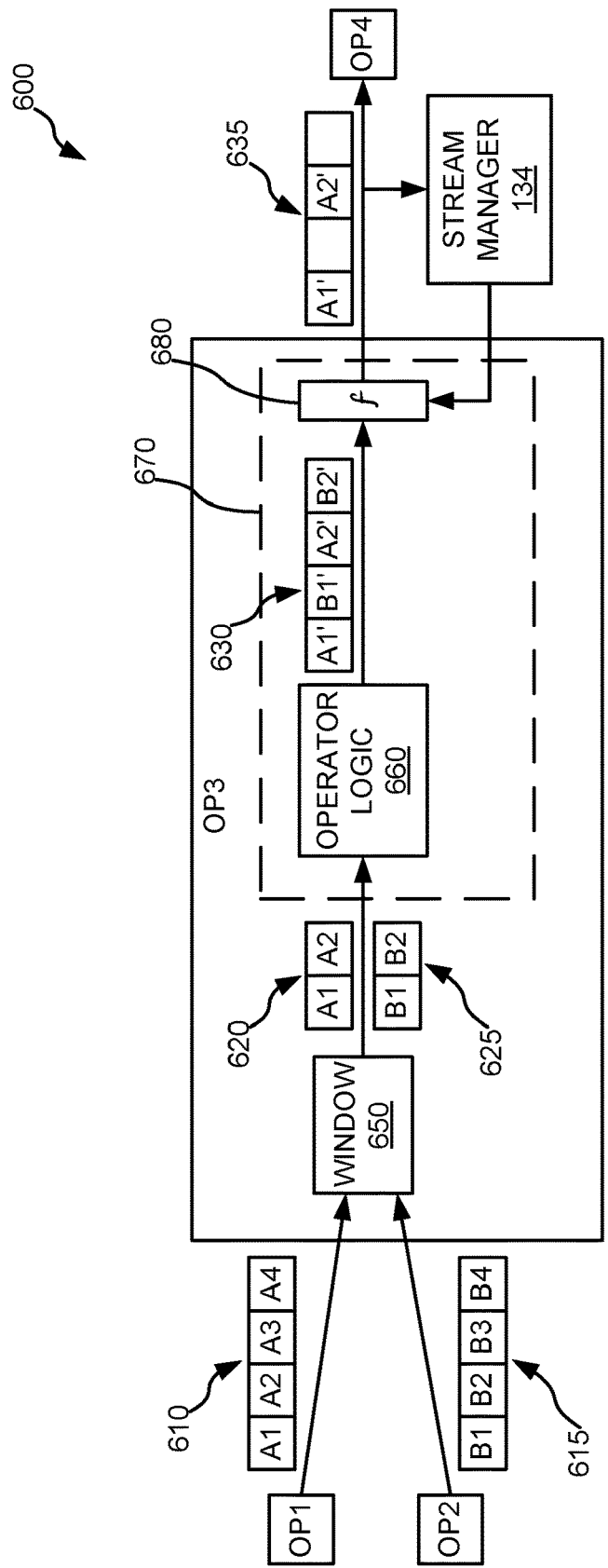
FIG. 6 illustrates a block diagram of an embodiment of a method for regulating output from one or more stream operators performing a windowing operation, according to various embodiments.

FIG. 6 illustrates a block diagram of an embodiment 600 of a method for regulating output from one or more stream operators performing a windowing operation, according various embodiments. The example embodiment 600 includes stream operators OP1, OP2, OP3 and OP4, along with stream manager 134. The example embodiment 600 may be implemented in a computing environment such as computing infrastructure 100. The operators may be part of a stream computing application on a single compute node, or the operators may be distributed amongst multiple compute nodes.

Operator OP3 includes window condition module 650, operator processing module 670 having operator logic module 660 and window operation output filter 680 (hereinafter filter 680). The window condition module 650 may be configured to receive one or more streams of tuples 610 and 615 from one or more operators (e.g., operators OP1 and OP2), and accumulate tuples from the streams until a window operation is triggered. A first stream of tuples (e.g., A1, A2, A3 and A4) 610 can be received from operator OP1, while a second stream of tuples (e.g., B1, B2, B3 and B4) can received from operator OP2. Referring again to the image processing application example, the first stream of tuples 610 may include tuples having raw digital images, while the second stream 615 may include tuples having metadata associated with the raw digital images.

The tuples can be accumulated in an operator window defined by condition module 650 until a window operation is triggered. The window condition module 650 may then provide a stream of accumulated tuples (e.g., A1, A2, B1 and B2) 620 and 625 to the operator processing module 670. In some embodiments, providing the stream of accumulated tuples 620 and 625 may include storing the tuples in an area of the memory of a compute node, and making the area of memory accessible by the operator processing module 670. In certain embodiments, the stream of accumulated tuples 620 and 625 may be a single stream of tuples.

Operator logic module 660 may receive the stream of accumulated tuples 620 and 625 and perform a given operation on the tuples to produce a new stream of processed tuples 630. The stream of processed tuples 630 having tuples A1', B1', A2', and B2' may be provided to filter 680. In the image processing application example, the stream of processed tuples 630 may include the watermarked digital images and the CAPTCHA images generated from the metadata.

Filter 680 may provide to operator OP4 an output stream of tuples 635 having tuples selected from the stream of processed tuples 630. Stream manager 134 may sample the stream of output tuples (e.g., a quantity of output of operator OP3) 635 and provide feedback to filter 680 indicating whether the filter should reduce the quantity of output in the output stream. The filter 680 may reduce the quantity of output in output stream 635 when the stream manager 134 indicates that the quantity of output is above a data threshold, determined as described herein. The filter 680 may reduce the amount of output by excluding certain tuples (e.g., B1' and B2') in the stream of processed tuples 630 from the output stream 635 (e.g., the output stream may only contain the tuples A1' and A2' from the stream of processed tuples). Referring again to the image processing application example, the filter 680 may exclude the CAPTCHA images from the output stream 635, while allowing the watermarked digital images. In some embodiments, the excluded stream of tuples may be discarded, or cached for use at a later time.

Figure 7:
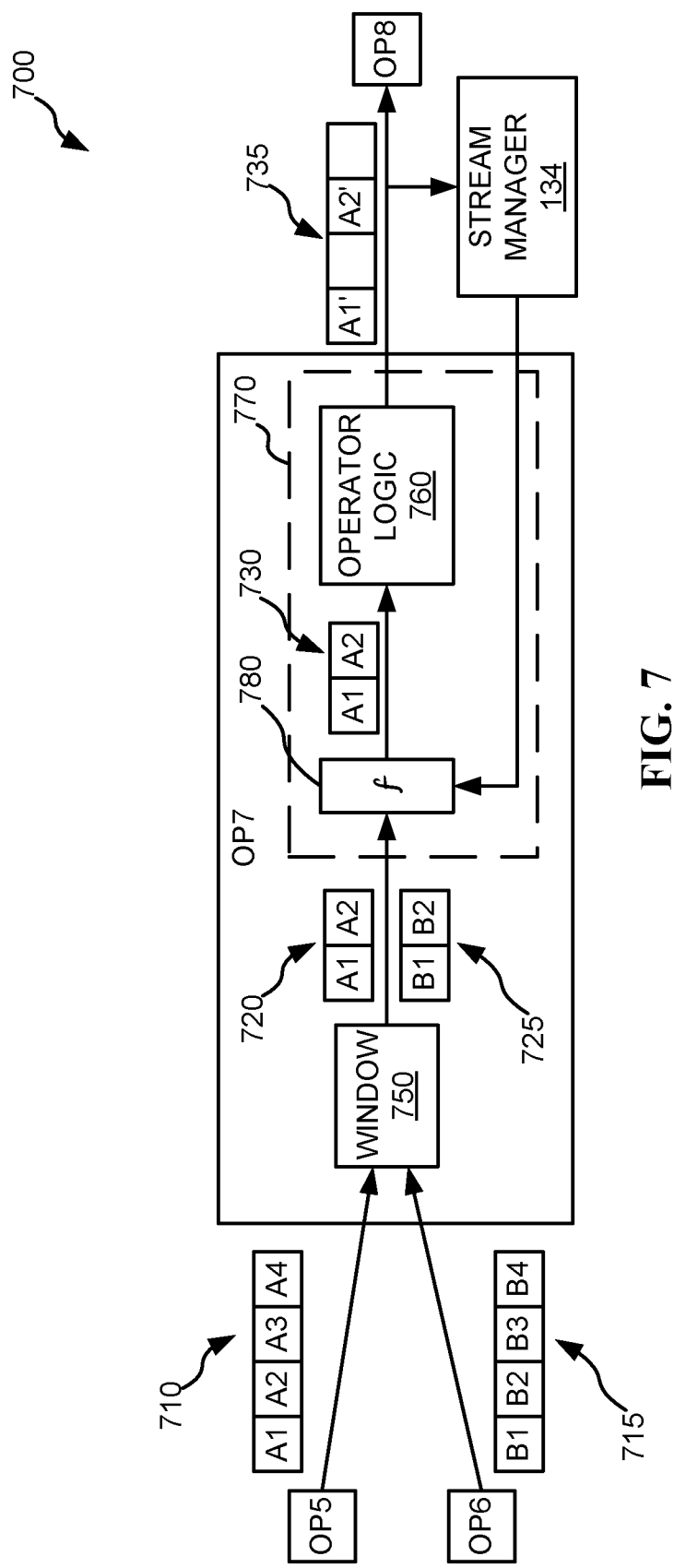
FIG. 7 illustrates a block diagram of a second embodiment of a method for regulating output from one or more stream operators performing a windowing operation, according to various embodiments.

FIG. 7 illustrates a block diagram of a second embodiment 700 of a method for regulating output from one or more stream operators performing a windowing operation, according various embodiments. The example embodiment 700 includes stream operators OP5, OP6, OP7 and OP8, along with stream manager 134. The example embodiment 700 may be implemented in a computing environment such as computing infrastructure 100. The operators may be part of a stream computing application on a single compute node, or the operators may be distributed amongst multiple compute nodes.

Operator OP7 includes window condition module 750, operator processing module 770 having operator logic module 760 and window operation output filter 780 (hereinafter filter 780). The window condition module may be configured to receive one or more stream of tuples 710 and 715 from one or more operators (e.g., operators OP5 and OP6), and accumulate tuples from the streams until a window operation is triggered. As shown in FIG. 7, a first stream of tuples (e.g., A1, A2, A3 and A4) 710 can be received from operator OP5, while a second stream of tuples (e.g., B1, B2, B3 and B4) can be received from operator OP6.

The tuples can be accumulated in an operator window determined by window condition module 750 until a window operation is triggered. The window condition module may then provide a stream of accumulated tuples (e.g., A1, A2, B1 and B2) 720 and 725 to the operator processing module 770. In some embodiments, providing the stream of accumulated tuples 720 and 725 may include storing the tuples in an area of memory of a compute node, and making the area of memory accessible by the operator processing module 770.

Filter 780 may receive the stream of accumulated tuples 720 and 725 and provide a stream of filtered tuples 730 to operator logic module 760. Operator logic module 760 may receive the stream of filtered tuples 730 and perform a given operation on the received tuples to produce a new stream of processed tuples 735. The stream of processed tuples 735 may be provided in a stream of output tuples to one or more downstream stream operators, including stream operator OP8.

Stream manager 134 may sample the stream of output tuples and provide feedback to filter 780 indicating whether the filter should reduce the quantity of output in the output stream. The filter 780 may reduce the quantity of output in output stream 735 when the stream manager 134 indicates that the quantity of output is above a data threshold, determined as described herein. The filter 780 may reduce the amount of output by excluding certain tuples (e.g., B1 and B2 from the accumulated stream of tuples 725) from the filtered stream of tuples 730. Referring again to the image processing application example, the filter 780 may exclude tuples containing metadata from the filtered stream of tuples 730, while allowing the tuples containing the raw digital images. The mechanisms for determining which tuples to execute can be the same as disclosed in the discussion of FIG. 6. In some embodiments, the excluded stream of tuples may be discarded, or cached for use at a later time.

Figure 8:
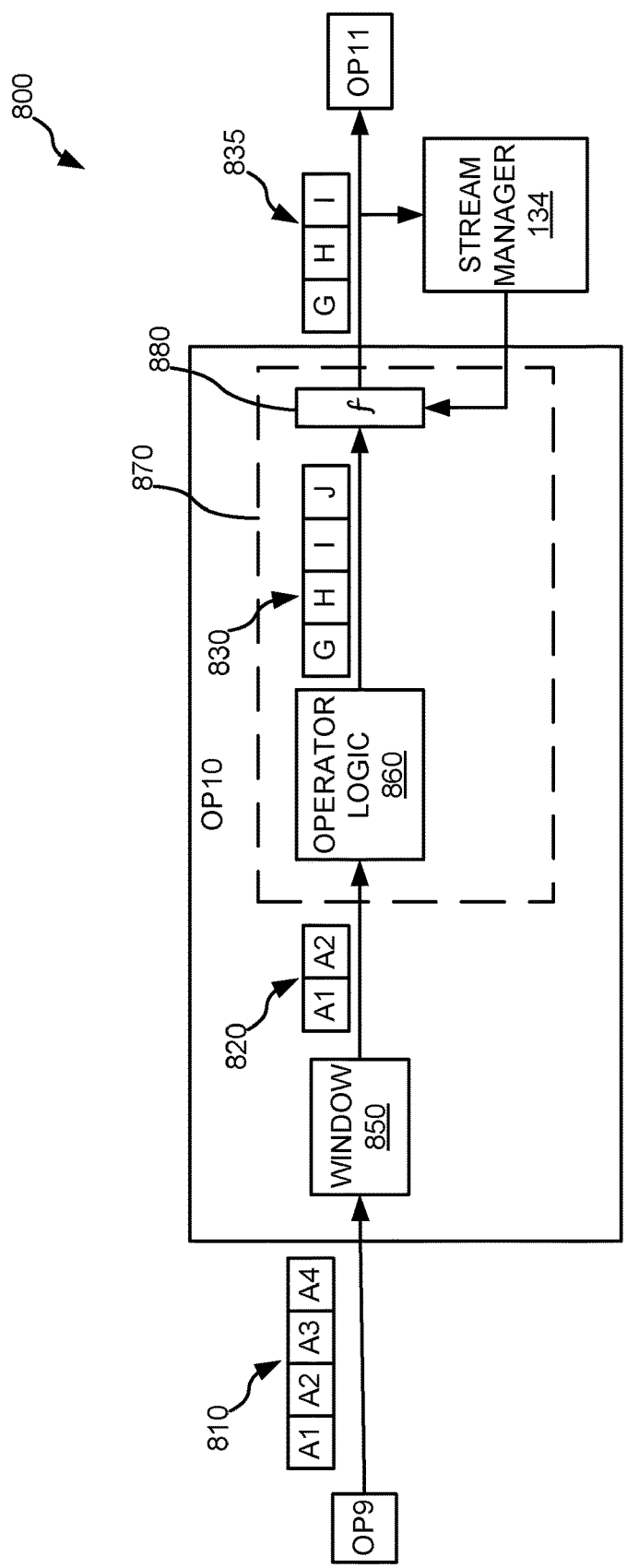
FIG. 8 illustrates a block diagram of an embodiment of a method for regulating output from one or more stream operators performing a windowing operation with output limiting after operating on accumulated tuples from an operator window, according various embodiments.

FIG. 8 illustrates a block diagram of an embodiment 800 of a method for regulating output from one or more stream operators performing a windowing operation with output limiting after operating on accumulated tuples from an operator window, according various embodiments. Embodiment 800 includes stream operators OP9, OP10, and OP11, along with stream manager 134. Embodiment 800 may be implemented in a computing environment such as computing infrastructure 100. The operators may be part of a stream computing application on a single compute node, or the operators may be distributed amongst multiple compute nodes.

Operator OP10 includes window condition module 850, operator processing module 870 having operator logic module 860 and window operation output filter 880 (hereinafter filter 880). The window condition module may be configured to receive one or more stream of tuples 810 (e.g., A1, A2, A3 and A4) from one or more operators (e.g., operator OP9), and accumulate tuples from the stream until a window operation is triggered. The tuples may be accumulated in an operator window determined by window condition module 850 until a window operation is triggered. The window condition module may then provide a stream of accumulated tuples (e.g., A1, A2) 820 to the operator processing module 870.

Operator logic module 860 may receive the stream of accumulated tuples 820 and perform a given operation on the tuples to produce a stream of processed tuples 830 having, for example, tuples G, H, I, and J. Deviating from the previous image processing example, the accumulated stream of tuples 820 may include a series of raw digital images. Operator logic module 860 may process the stream of raw digital images to produce the stream of processed tuples 830 having, for example, images of the sum of images in an operator window, the difference between images in an operator window, the average energy of the images in an operator window, and the frequency domain representation of an image having the most energy in a window. The stream of processed tuples 830 may be provided to filter 880.

Filter 880 may provide operator OP11 a stream of output of tuples 835 having tuples selected from the stream of processed tuples 830. Stream manager 134 may sample the stream of output tuples (e.g., a quantity of output of operator OP10) 835 and provide feedback to filter 880 indicating whether the filter should reduce the quantity of output in the stream of output tuples. The filter 880 may reduce the quantity of output in the stream of output tuples 835 when the stream manager 134 indicates that the quantity of output is above a data threshold, determined as described herein. The filter 880 may reduce the amount of output by excluding certain tuples (e.g., tuple J) in the stream of processed tuples 830 from the stream of output tuples 835 (e.g., the output stream may only contain the tuples G, H and I from the stream of processed tuples). Referring back to the most recent example, the filter 880 may exclude the tuples having an images of the frequency representation of the image having the most energy in the stream of processed tuples 830. In some embodiments, the excluded tuples may be discarded, or cached for use at a later time.

Figure 9:
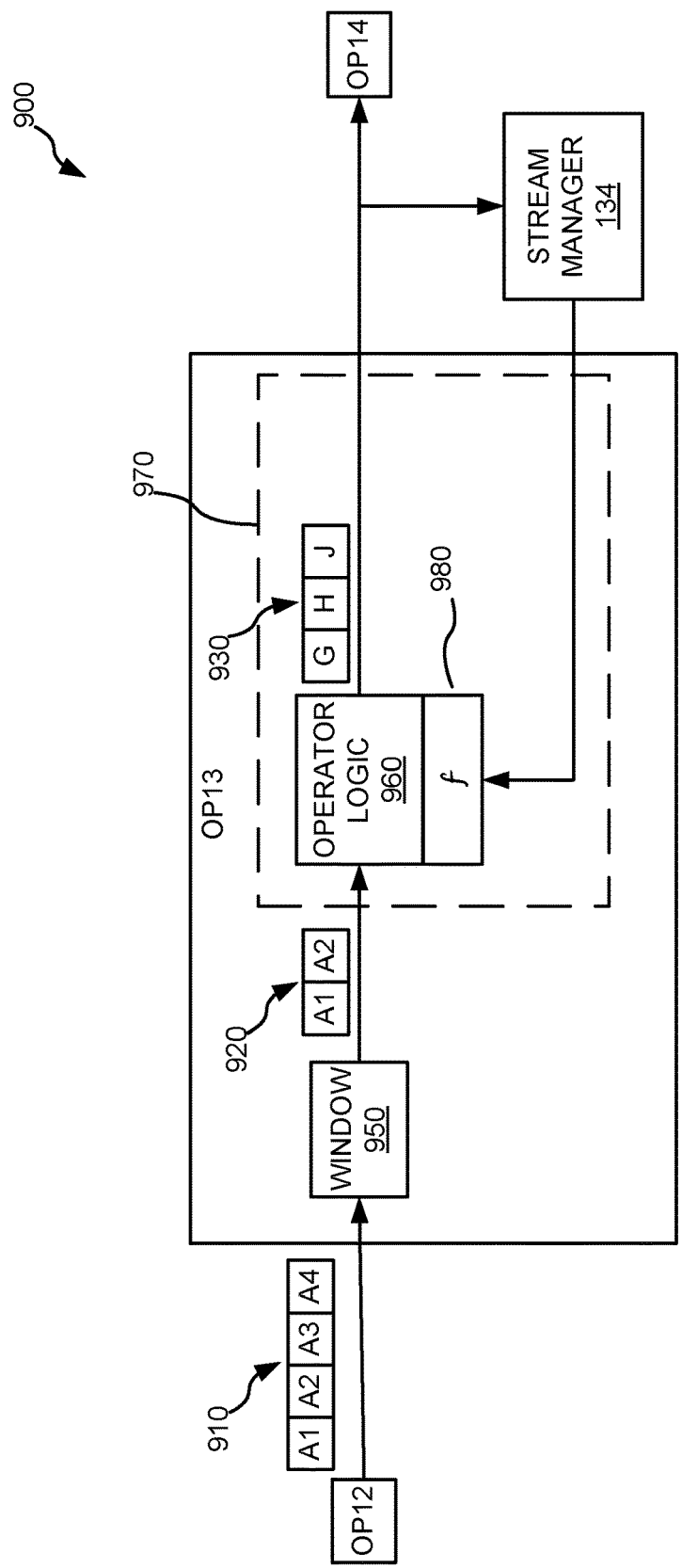
FIG. 9 illustrates a block diagram of an embodiment of a method for regulating output from one or more stream operators performing a windowing operation with output limiting while operating on accumulated tuples from an operator window, according various embodiments.

FIG. 9 illustrates a block diagram of an embodiment 900 of a method for regulating output from one or more stream operators performing a windowing operation with output limiting while operating on accumulated tuples from an operator window, according various embodiments. Embodiment 900 includes stream operators OP12, OP13, and OP14, along with stream manager 134. Embodiment 900 may be implemented in a computing environment such as computing infrastructure 100. The operators may be part of a stream computing application on a single compute node, or the operators may be distributed amongst multiple compute nodes.

Operator OP13 includes window condition module 950, operator processing module 970 having operator logic module 960 and window operation output filter 980 (hereinafter filter 980). The window condition module may be configured to receive one or more stream of tuples 910 (e.g., A1, A2, A3 and A4) from one or more operators (e.g., operator OP12), and accumulate tuples from the stream until a window operation is triggered. The tuples can be accumulated in an operator window determined by window condition module 950 until a window operation is triggered. The window condition module may then provide a stream of accumulated tuples (e.g., A1, A2) 920 to the operator processing module 970.

Operator logic module 960 may receive the stream of accumulated tuples 920 and perform a given operation on the tuples to produce a stream of processed tuples 930. The operation of operator logic module 960 is similar to the operation of operator logic module 860 with the exception that the stream of output tuples 930 is sampled by stream manager 134. Stream manager 134 may provide feedback to filter 980 indicating whether the filter should reduce the quantity of output in the stream of output tuples. In some embodiments, filter 980 may be integrated with operator logic 960, and may, in response to the feedback from stream manager 134, reduce the quantity of output in the stream of output tuples 930 by preventing the operator logic from producing a certain types of tuples. Referring the example discussed in association with FIG. 8, filter 980 may prevent operator logic 960 from generating tuples having images showing the average energy of the images in an operator window. Operator OP14 may receive the stream of processed tuples 930.

Figure 10:
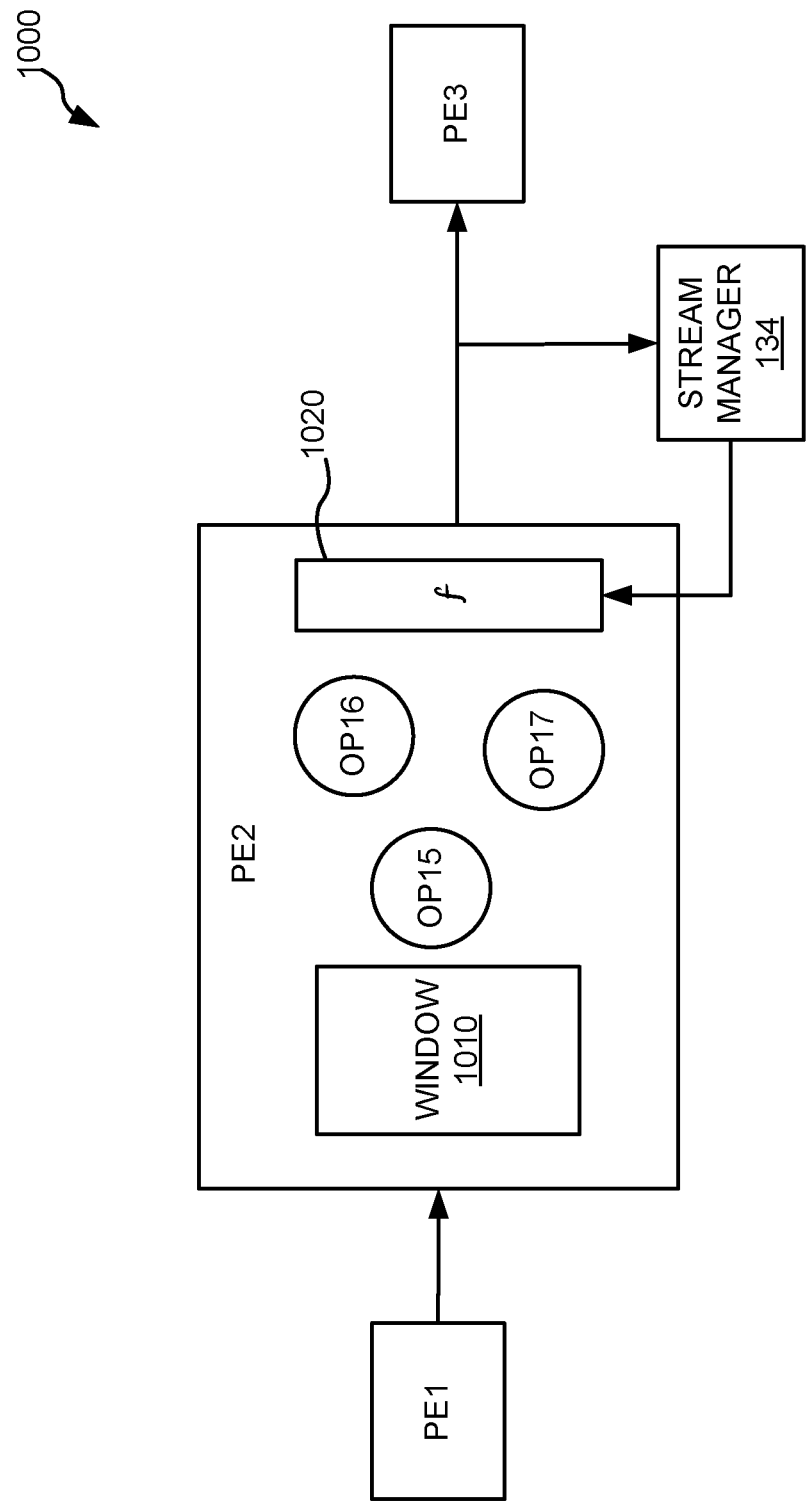
FIG. 10 illustrates a block diagram of an embodiment of a method for regulating output from one or more processing elements performing a windowing operation, according various embodiments.

FIG. 10 illustrates a block diagram of an embodiment 1000 of a method for regulating output from one or more processing elements performing a windowing operation, according various embodiments. Embodiment 1000 includes processing elements PE1, PE2, and PE3, along with stream manager 134. Embodiment 1000 may be implemented in a computing environment such as computing infrastructure 100. The processing elements may be part of a stream computing application on a single compute node, or the processing elements may be distributed amongst multiple compute nodes, and connected by, for example, a communications network such as network 120.

Processing element PE2 includes window condition module 1010, operators OP15, OP16, and OP17, and window operation output filter 1020. The window condition module 1010 may be configured to receive one or more streams of tuples (not shown) from one or more processing elements (e.g., processing element PE1), and accumulate tuples from the streams until a window operation is triggered. Window conditioning module 1010, on behalf of processing element PE2, may provide a stream of accumulated tuples to one or more of operators OP15, OP16, and OP17. Operators OP15, OP16, and OP17 may be arranged in an operator graph and configured receive a stream of accumulated tuples and provide a stream of output tuples to processing element PE3.

In some embodiments, stream manager 134 may sample the stream of output tuples and provide feedback to filter 1020 indicating whether the filter should reduce the quantity of output in the stream of output tuples. The filter 1020 may reduce the quantity of output in the stream of output tuples when the stream manager 134 indicates that the quantity of output is above a data threshold, determined as described herein. The filter 1020 may reduce the quantity of output in the stream of output tuples using the methods already described in herein. Filter 1020 may, for example, exclude tuples from the stream of accumulated tuples provided to at least one of operators OP15, OP16, and OP17. Filter 1020 may also exclude tuples produced by at least one of operators OP15, OP16, and OP17 from the stream of output tuples provided to processing element PE3. In some embodiments, filter 1020, on the behalf of processing entity PE2, may reduce the quantity of output in the stream of output tuples by reducing the output threshold (e.g., a threshold value used to limit the output of a windowing operator in response to a windowing operation) for one or more of operators OP15, OP16 and OP17.

Figure 11A:
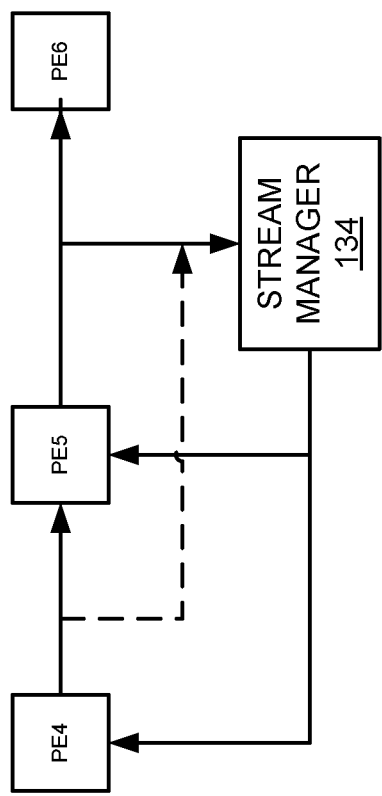
FIG. 11A illustrates a block diagram of an embodiment of a method for regulating output from one or more processing elements or operators performing a windowing operation, according various embodiments.

FIG. 11A illustrates a block diagram of an embodiment of a method for regulating output from one or more processing elements or operators performing a windowing operation, according various embodiments. The embodiment in FIG. 11A includes processing elements PE4, PE5, and PE6, along with stream manager 134. In some embodiments, the processing elements PE4, PE5, and PE6 may be stream operators such as the stream operators shown in FIGS. 6-9. In other embodiments, the processing elements PE4, PE5, and PE6 may be processing elements similar to processing element PE2 shown in FIG. 10.

Processing elements PE4, PE5, and PE6 can be arranged in a graph such that PE4 provides a stream of tuples to PE5, while PE5 provides a stream of tuples to PE6 at least partially in response to receiving tuples from PE4. In this configuration PE6 is downstream from PE5, and both PE5 and PE6 are downstream from PE4. The embodiment in FIG. 11A illustrates that stream manager 134 may monitor a quantity of output from a one or more processing elements connected in an graph, and provide feedback to limit the output of one or more upstream processing elements (e.g., upstream from the point on the monitoring) in response to the monitoring. In FIG. 11A, for example, stream manager 134 may monitor a quantity of output from processing entity PE5 and provide feedback to limit the output of PE4 and PE5. In some embodiments, stream manager 134 may monitor a quantity of output from a one or more processing entities connected in a graph, and provide feedback to limit the output of one or more downstream processing elements in response to the monitoring.

Figure 11B:
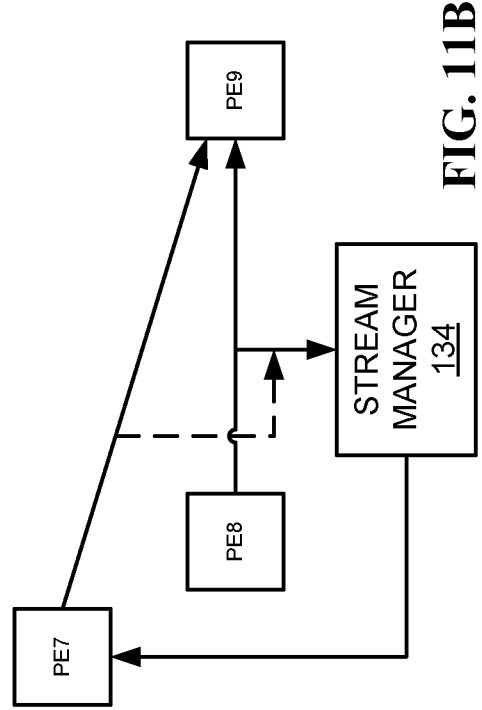
FIG. 11B illustrates a block diagram of an embodiment of a method for regulating a quantity of output from one or more processing elements or operators performing a windowing operation, according various embodiments.

FIG. 11B illustrates a block diagram of an embodiment of a method for regulating a quantity of output from one or more processing elements or operators performing a windowing operation, according various embodiments. The embodiment in FIG. 11B includes processing elements PE7, PE8, and PE9, along with stream manager 134. In some embodiments, the processing elements PE7, PE8, and PE9 may be stream operators such as the stream operators shown in FIGS. 6-9. In other embodiments, the processing elements PE7, PE8, and PE9 may be processing elements similar to processing element PE2 shown in FIG. 10.

Processing elements PE7, PE8, and PE9 may be arranged in a graph such that PE7 provides a stream of tuples to PE9 in response to a windowing operation triggered subsequent to receiving a stream of tuples from a first source (not shown). Additionally, PE8 may provide a stream of tuples to PE9 at least partially in response to a windowing operation triggered subsequent to receiving a stream of tuples from a second source (not shown). In some embodiments, the first source and the second source may be the same source.

The embodiment in FIG. 11B illustrates that stream manager 134 may monitor a quantity of output from a one or more processing elements connected in an graph, and provide feedback to limit the output of one or more processing elements, where at least one of the processing elements whose output is being limited is not coupled to at least one of the outputs that are being monitored. For example, in FIG. 11B, stream manager 134 may monitor a quantity of output from processing entity PE8 and provide feedback to limit the output of PE7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for processing a stream of tuples comprising:
   one or more compute nodes, each compute node having one or more computer processors and a memory, wherein the one or more compute nodes include one or more processing elements operating on at least one computer processor, each processing element having one or more stream operators, wherein the at least one computer processor is configured to perform a method comprising:
   receiving a first stream of tuples at a first stream operator, the first stream operator being configured to generate a stream of accumulated tuples according to a set of windowing conditions;
   processing, by the first stream operator, the stream of accumulated tuples in response to a window trigger, wherein the processing generates a quantity of output;
   monitoring the quantity of output;
   determining a data output threshold by:
      continuously monitoring a processor workload in the one or more compute nodes;
      determining that the processor workload for a particular node is outside a range; and
      determining an amount by which output of stream operators executing on the particular node must be reduced to cause the processor workload for the particular node to be within the range;
   determining whether the quantity of output exceeds the data output threshold; and
   adjusting, in response to determining that the quantity of output exceeds the data output threshold, the processing of a second stream of tuples by a second stream operator to reduce the output to approach the data output threshold, wherein the processing of the second stream of tuples is in response to a second window trigger.

2. The system of claim 1, wherein the method performed by the at least one computer processor further comprises:
   adjusting the processing of the first stream operator to reduce the quantity of output.

3. The system of claim 2, wherein the adjusting the processing of the first stream operator further comprises:
   determining that a first tuple of the stream of accumulated tuples is from the first stream; and
   excluding, in response to determining that the first tuple is from the first stream, the first tuple from the processing, wherein the excluding includes caching the first tuple and removing the first tuple from the stream of accumulated tuples prior to processing the stream of accumulated tuples.

4. The system of claim 2, wherein the adjusting the processing of the first stream operator further comprises:
   determining that a first tuple generated by the first stream operator from the stream of accumulated tuples is derived from the first stream of tuples; and
   excluding, in response to determining that the first tuple from the stream of accumulated tuples is derived from the first stream of tuples, the first tuple from the quantity of output.

5. The system of claim 1, wherein the quantity of output is a data size.

6. The system of claim 1, wherein the quantity of output is a number of tuples.

7. The system of claim 1, wherein the first stream operator is configured to transmit a first set of output tuples to a third stream operator, wherein the second stream operator is configured to transmit a second set of output tuples to the third stream operator, and wherein the method performed by the at least one computer processor further comprises:
   identifying a first tuple in the stream of accumulated tuples;
   identifying a second tuple in the stream of accumulated tuples;
   determining a processing impact of processing the first tuple;
   determining a processing impact of processing the second tuple;
   comparing the processing impact for the first tuple to the processing impact for the second tuple;
   determining, based on the comparing, that the processing impact for the first tuple is greater than the processing impact for the second tuple;
   caching, in response to determining that the processing impact for the first tuple is greater than the processing impact for the second tuple, the first tuple;
   removing the first tuple from the stream of accumulated tuples prior to the processing the stream of accumulated tuples;
   transmitting the quantity of output to the third stream operator at a first time;
   accumulating tuples from the first stream of tuples to generate a second stream of accumulated tuples;
   adding the first tuple to the second stream of accumulated tuples;
   processing, by the first stream operator, the second stream of accumulated tuples in response to a third window trigger, wherein the processing the second stream of accumulated tuples generates a second quantity of output; and
   transmitting the second quantity of output to the third stream operator at a second time, the second time being subsequent to the first time.

8. A computer program product for processing a stream of tuples, the computer program product including a computer readable storage medium having program instructions embodied therewith, wherein the computer readable storage medium is not a transitory signal per se, the program instructions executable by a processing circuit to cause the processing circuit to perform a method comprising:
   receiving a first stream of tuples at a first stream operator, the first stream operator being configured to generate a stream of accumulated tuples according to a set of windowing conditions;

processing, by the first stream operator, the stream of accumulated tuples in response to a window trigger, wherein the processing generates a quantity of output;

monitoring, by at least one processor, the quantity of output;

determining a data output threshold by:
  continuously monitoring a processor workload in one or more nodes;
  determining that the processor workload for a particular node is outside a range; and
  determining an amount by which output of stream operators executing on the particular node must be reduced to cause the processor workload for the particular node to be within the range;

determining whether the quantity of output exceeds the data output threshold; and adjusting, in response to determining that the quantity of output exceeds the data output threshold, the processing of a second stream of tuples by a second stream operator to reduce the output to approach the data output threshold, wherein the processing of the second stream of tuples is in response to a second window trigger.

9. The computer program product of claim 8, wherein the method performed by the processing circuit further comprises:
  adjusting the processing of the first stream operator to reduce the quantity of output.

10. The computer program product of claim 9, wherein the adjusting the processing of the first stream operator further comprises:
  determining that a first tuple of the stream of accumulated tuples is from the first stream; and
  excluding, in response to determining that the first tuple of the stream of accumulated tuples is from the first stream, the first tuple from the processing, wherein the excluding includes caching the first tuple and removing the first tuple from the stream of accumulated tuples prior to processing the stream of accumulated tuples.

11. The computer program product of claim 9, wherein the adjusting the processing of the first stream operator further comprises:
  determining that a first tuple generated by the first stream operator from the stream of accumulated tuples is derived from the first stream of tuples; and
  excluding, in response to determining that the first tuple from the stream of accumulated tuples is derived from the first stream of tuples, the first tuple from the quantity of output.

12. The computer program product of claim 8, wherein the quantity of output is a data size.

13. The computer program product of claim 8, wherein the quantity of output is a number of tuples.

14. The computer program product of claim 8, wherein the first stream operator is configured to transmit a first set of output tuples to a third stream operator, wherein the second stream operator is configured to transmit a second set of output tuples to the third stream operator, and wherein the method performed by the processing circuit further comprises:
  identifying a first tuple in the stream of accumulated tuples;
  identifying a second tuple in the stream of accumulated tuples;
  determining a processing impact of processing the first tuple;
  determining a processing impact of processing the second tuple;
  comparing the processing impact for the first tuple to the processing impact for the second tuple;
  determining, based on the comparing, that the processing impact for the first tuple is greater than the processing impact for the second tuple;
  caching, in response to determining that the processing impact for the first tuple is greater than the processing impact for the second tuple, the first tuple;
  removing the first tuple from the stream of accumulated tuples prior to the processing the stream of accumulated tuples;
  transmitting the quantity of output to the third stream operator at a first time;
  accumulating tuples from the first stream of tuples to generate a second stream of accumulated tuples;
  adding the first tuple to the second stream of accumulated tuples;
  processing, by the first stream operator, the second stream of accumulated tuples in response to a third window trigger, wherein the processing the second stream of accumulated tuples generates a second quantity of output; and
  transmitting the second quantity of output to the third stream operator at a second time, the second time being subsequent to the first time.

* * * * *